March 6, 1956 P. E. OHMART 2,737,592
DENSITY RESPONSIVE APPARATUS
Filed Oct. 13, 1953 3 Sheets-Sheet 1
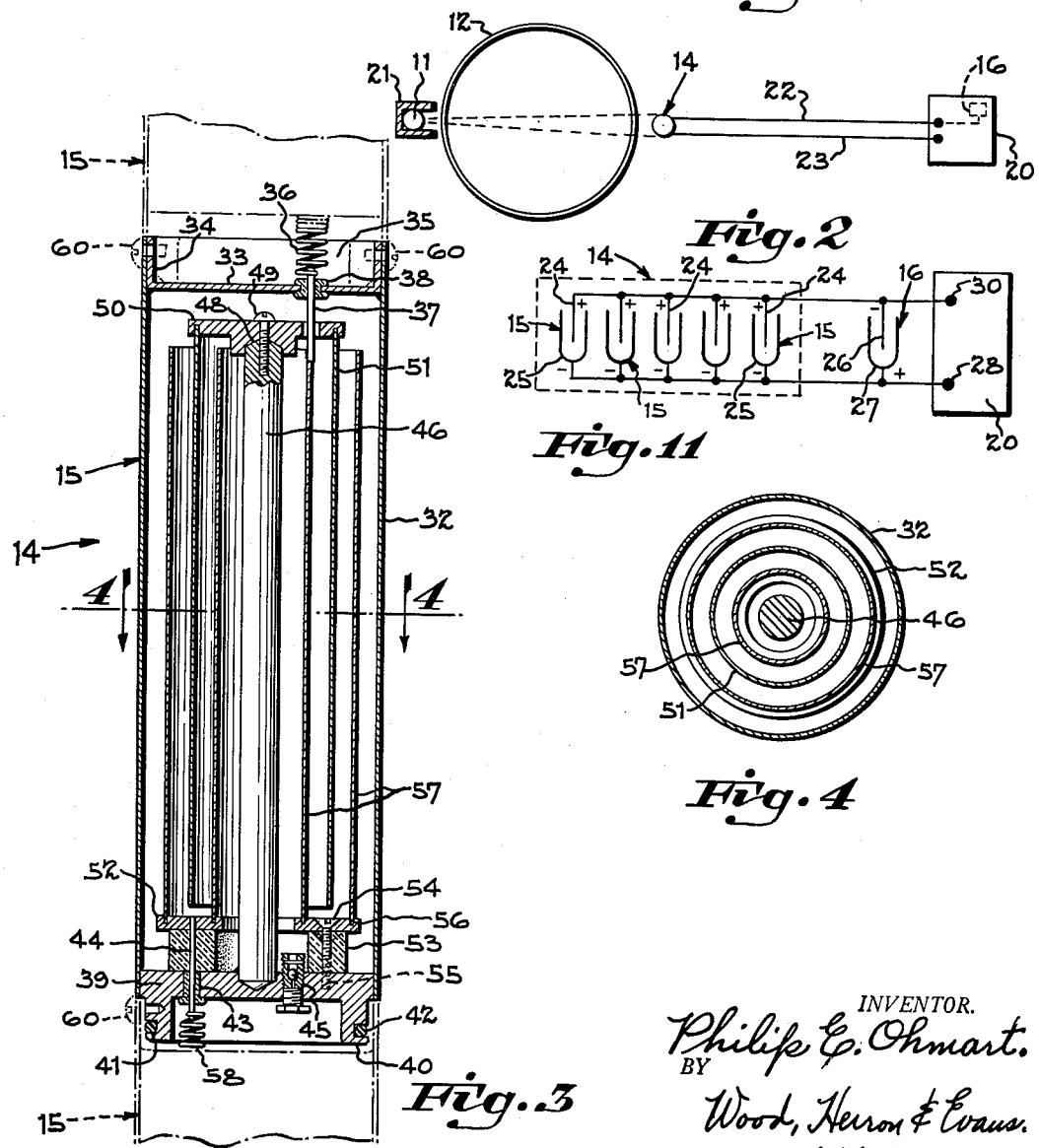

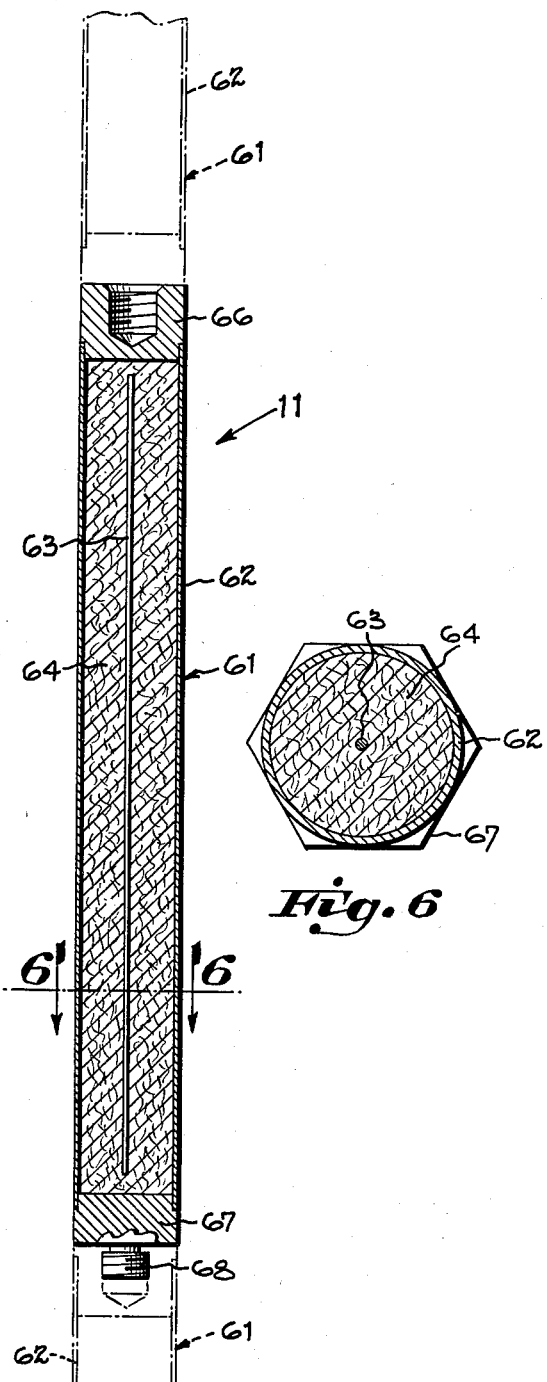
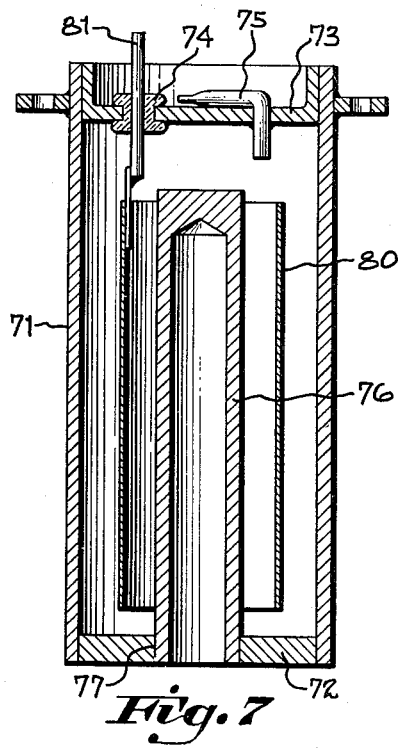
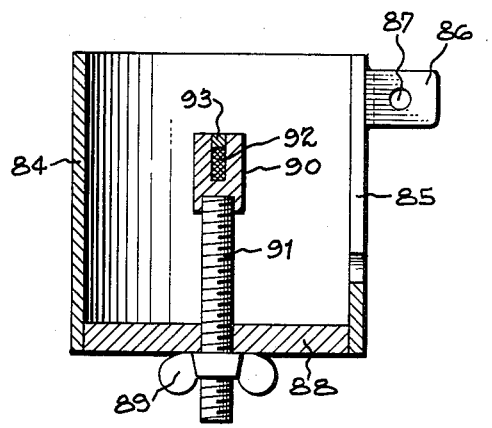

ແ
2,737,592

DENSITY RESPONSIVE APPARATUS

Philip E. Ohmart, Cincinnati, Ohio, assignor to The Ohmart Corporation, Cincinnati, Ohio, a corporation of Ohio Application October 13, 1953, Serial No. 385,753

10 Claims. (Cl. 250—43.5)

This invention relates to apparatus for measuring or controlling the density, or level of liquids or other fluent materials, and is particularly directed to apparatus of this type employing one or more Ohmart cells as a condition sensing element.

One type of apparatus, embodying a radiant energy electric generator, or Ohmart cell, which is adapted for the measurement or control of liquid level, interface level and density is disclosed in my copending application on "Comparator," Serial No. 280,842, filed April 5, 1952, and a specific form of control device responsive to the level of liquid within a container is shown in my copending application on "Control Device," Serial No. 340,108, filed March 3, 1953. The present invention is directed to improvements in the apparatus disclosed in these applications.

As explained in my earlier copending applications, a radiant energy electric generator, or Ohmart cell can be employed to generate a current, the magnitude of which varies in accordance with the level or density of material within a container, and consequently, a cell may be used to index either or both of these variable quantities. More particularly, as explained in these applications, all other factors being held constant, the current which is produced by an Ohmart cell, and which will flow through an external circuit connecting the cell electrodes, will vary in a predetermined manner with the density of the impinging ionizing energy. This ionizing energy may be obtained from any number of sources; for example, radioactive material such as strontium 90, X-ray tubes, and ultra violet lamps.

The theory of Ohmart cell operation is described in greater detail in the above identified copending applications. It will suffice here to state that essentially an Ohmart cell comprises three elements: a first electrode, a second electrode electrochemically dissimilar from the first, and electrically insulated from it, and an ionizable gas in contact with the two. Due to the chemical asymmetry of the electrodes, a field bias is created between them. When the gas within the cell is ionized by the impingement of ionizing radiation, or by secondary radiation, in turn caused by the ionizing energy, there will be a discriminatory migration of the ions toward the electrodes. The positive ions will move toward the more noble electrode, and the negatively charged electrons will move toward the more active electrode. These particles will collect on the respective electrodes, causing a potential difference to be built up between them.

If an external leakage path is provided between the electrodes, the electrons will pass through the external path from the negative electrode toward the positive electrode where they neutralize the positive ions to form gas molecules. For each electron that is picked up by a positive ion, an additional electron flows through the external circuit from the negative to the positive electrode. The magnitude of current flow varies with the density of the impinging ionizing energy. This variation in current magnitude is employed in the present invention to index either the level or denisty of a fluent material.

Furthermore, as disclosed in my copending application on "Comparator," two Ohmart cells may be connected in parallel opposed, or short circuited, relationship without injury to either of the cells, and when so arranged, the net output signal of the cells can be employed to index a variable condition. More specifically, when cells are connected in parallel opposition, the positive electrode of each cell is connected to the negative electrode of the other cell and an output lead is connected to each of these junction. When using cells connected in this manner to index a variable condition, one of the cells, termed the measuring cell, is operated under the influence of the variable condition being measured, while the other cell is operated independently of variations in that condition. The cells are preferably arranged so that for a predetermined value of the variable condition, the currents produced by the cells cancel one another out, and the total output will be zero. When the variable condition deviates, however, from this predetermined value, the deviation is reflected by the difference in the two currents giving rise to a net output signal.

This signal may be amplified in any of a number of conventional manners and used to operate an instrument to indicate the value of the variable condition, or a control apparatus for affecting the variable condition. The many advantages obtained from a system of this type are explained in my copending application and will not be repeated here, other than to say that cells connected in this manner are operated at their greatest sensitivity and furnish great accuracy since the effects of variations in many extraneous factors such as temperature, humidity, etc. are eliminated.

The principal object of the present invention is to provide an apparatus utilizing Ohmart cells connected in parallel opposition for accurately measuring or controlling the height of a liquid or interface between two immiscible substances within a container, throughout a substantial fraction of the height of the container.

A further object of the present invention is to provide apparatus of this type in which the current developed for operating the control or indicating device varies linearly with changes in liquid level throughout the whole range of measurement. Hence, once the indicating apparatus has been calibrated at two levels, the remaining readings on the indicator will automatically correspond to the correct values of liquid level.

More specifically, a liquid level apparatus constructed in accordance with this invention comprises a "strip cell," including a plurality of vertically arranged Ohmart cells disposed end to end and connected in parallel electrical relationship, a compensating cell connected in parallel-opposed, or short circuited, relationship with the electrodes of the strip cell and a substantially continuous strip source of radioactivity of approximately the same length as the strip cell. The strip cell and strip source are disposed relative to a column of liquid so that radiations emitted by the source pass through the liquid and impinge upon the cell.

The present invention is predicated upon the discovery that a liquid level apparatus so constructed is effective to generate a net current output for operating a measuring or control device, which current output will vary in a linear fashion with changes in liquid level throughout a range of liquid levels extending substantially from the bottom of the strip cell to its top. Consequently apparatus of this invention is effective to provide accurate measurement or control over extremely wide ranges of liquid level with an absolute minimum calibration.

The present invention is also directed to the construction of a strip cell which is readily assembled and in which the need of external wiring for connecting the component cells in parallel relationship is eliminated. In accordance with the present invention the strip cell is constructed from a plurality of identical Ohmart cells. Each cell includes a housing containing a positive and negative electrode. The housing is enclosed by two end members, one of which has peripheral flanges coextensive with the end of the housing and a transverse wall spaced inwardly from the end of the housing. The other closure member includes a peripheral projection adapted for telescopic insertion into the flanged end of another cell. The outer casing is in electrical connection with one of the cell electrodes, and a connector is provided in each of the end members for electrical connection to the second, or insulated, electrode. Each of these connectors is joined to a connector of the mating cell when the cells are assembled, and this connection is completely enclosed by the two mating end members. Thus, all of the electrodes of one polarity are electrically connected by the engagement of the respective housings, and the electrodes of the opposite polarity are connected through the insulated electrodes and the connectors provided at each end of the housing. Consequently by means of this arrangement, the cells not only constitute their own structural support, but in addition form their own self-contained parallel circuit.

Another aspect of the present invention resides in the construction of the strip source. This source, when assembled, provides a substantially continuous elongated emitter, in which radioactive material is uniformly distributed from one end to the other. More specifically, the strip source comprises a plurality of component sources, each of which includes an elongated housing, encasing an elongated radioactive element extending from one end of the housing to the other end. The radioactive element is preferably in the form of a coated wire or strip disposed axially of the casing and held in place by means of structural supports or inert packing material to prevent its accidental displacement. The component source also includes coupling members disposed at the ends of the housing, the coupling members being effective to facilitate the securance of a plurality of component sources in endwise abutment.

Another object of the present invention is to provide a means for increasing the magnitude of the current change corresponding to a given increase in liquid level. This object is accomplished by providing means in association with either the cell or the source for collimating the radiant beam impinging upon the cell. In other words, I have found that by collimating the radiations so that only those radiations traveling directly from the source to the cell impinge upon the cell, the rate of change of current magnitude for a given change in liquid level is greatly increased.

A still further object of this invention is to provide a compensating cell, the current output of which can readily be varied. More specifically, a preferred embodiment of a compensating cell, which can be placed either adjacent to the strip cell or can be incorporated into the measuring or control device, includes in addition to a positive and negative electrode, and a filling gas, a self-contained source of radioactive material together with means for varying the position of the radioactive material within the cell. By shifting the radioactive material toward and away from the center of the cell, its effectiveness to ionize the filling gas is altered and consequently the magnitude of the current produced by the cell is also changed.

These and other advantages of the present invention will be apparent from a further consideration of the following detailed description of the drawings illustrating a preferred embodiment of the present invention.

In the drawings:

Figure 1 is a diagrammatic side elevational view of a strip cell and strip source showing the manner in which they are employed as component parts of a liquid level measuring or control device.

Figure 2 is a diagrammatic top plan view of a modified form of the apparatus shown in Figure 1.

Figure 3 is a cross sectional view of one of the Ohmart cells forming the strip cell.

Figure 4 is a cross sectional view taken along line 4—4 of Figure 3.

Figure 5 is a longitudinal cross sectional view of one of the component source holders forming the strip source.

Figure 6 is a cross sectional view taken along line 6—6 of Figure 5.

Figure 7 is a longitudinal cross sectional view of a compensatory cell.

Figure 8 is a longitudinal cross sectional view of the cap used with the compensatory cell.

Figure 11 is a schematic circuit diagram of the apparatus shown in Figures 1 and 2.

Figure 9:
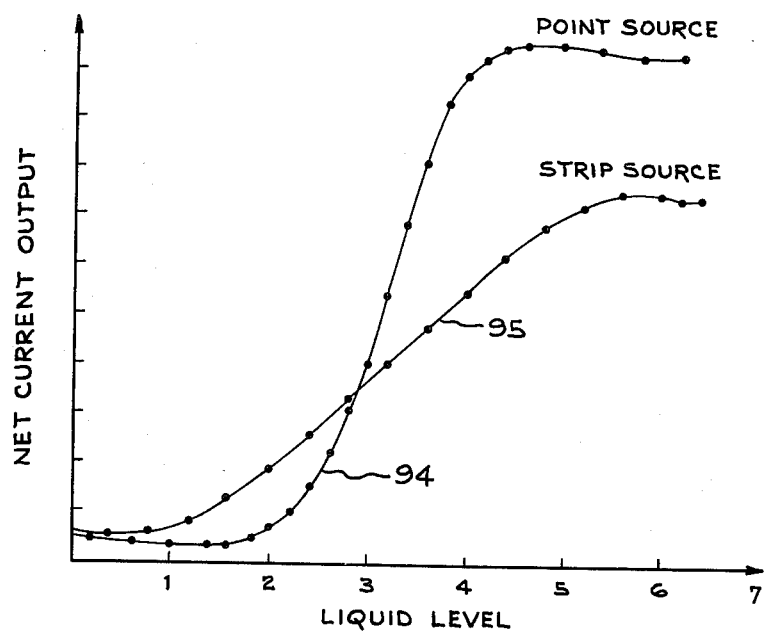
Figure 9 is a graph showing the manner in which the current output of an Ohmart cell varies in accordance with the height of a liquid when both a point source and strip source of radioactivity are employed.

As shown in Figure 1, one form of liquid level measuring apparatus constructed in accordance with the present invention comprises a strip source of radioactive material 11, disposed on one side of a container 12, filled with liquid 13. A strip cell 14, or more particularly a plurality of longitudinally aligned Ohmart cells, or component radiant energy electric generators, 15 in parallel electrical connection, is disposed on the opposite side of the container, together with a compensating cell 16. One terminal electrode of the strip cell and the electrode of opposite polarity of the compensating cell are respectively joined together through lead 17 and are connected to a measuring or control device 20 by means of lead 18. The other terminal electrode of the strip cell and the second electrode of the compensating cell are connected to the measuring or control device through lead 19.

Device 20 is responsive to the net current output of the strip cell and compensating cell and may include means such as a dial or recording instrument for indicating the liquid level. Or alternatively, device 20 may include means responsive to the net current output of the cells effective to acuate suitable apparatus such as electric solenoid valves for maintaining the liquid within the container at a predetermined level. If desired, device 20 can perform two or more of these functions simultaneously, that is, for example it can both control the height of a liquid level and simultaneously provide a visual indication of the level.

A preferred embodiment of a strip cell and strip source are described in detail below. It will suffice here to state that the strip cell is disposed vertically adjacent the wall of the container; while the strip source is disposed vertically adjacent to a wall of the container at a point spaced from the cell so that the radiation emitted from the source must pass through the liquid or other material within the container before impinging upon the cell. Depending upon various factors such as the type of radiation employed, the density of the material being measured, the thickness of the container walls, etc., it may be preferable in some installations to shift the relative position of the cell and strip so that they lie along the extension of a chordal line rather than a diametral one as shown. In some cases it may even be desirable to mount the radioactive material within the container. No matter how the strip cell and strip source are arranged relative to the wall of the container, they are preferably of substantially the same height as one another and extend for a distance corresponding to, or slightly in excess of, the range of liquid levels to be measured.

It is to be understood that a strip cell and strip source arranged as described can be employed for the measurement or control of the level of the interface between two immiscible liquids; or alternatively the apparatus can be employed to determine or control the slurry level between a solid material and a liquid floating above it. Furthermore, if the container is filled with a substantially homogeneous material, the density of this material can be determined by means of the same apparatus and by connecting device 20 to suitable valves, burners or other elements the material density can be controlled as readily as liquid level.

Figure 2 is a diagrammatic plan view of a slightly modified form of the apparatus shown in Figure 1. As shown in Figure 2 the radioactive source 11 is provided with a substantially U-shaped collimating shield 21 which is effective to direct the radiations emitted from source 11 in a narrow beam through the container and liquid onto the strip cell 14. The advantages obtained from the use of such a collimating shield will be explained below. The compensating cell 16 in this embodiment is not mounted on top of the strip cell, but is made an integral part of the measuring or control apparatus 20. One of the terminal electrodes of the strip cell is connected through lead 22 to one electrode of compensating cell 16, while another electrode of the strip cell is connected through lead 23 to the measuring or control instrument, the other electrode of the compensating cell being connected to this same lead so that the circuit arrangement is the same as that of the embodiment shown in Figure 1.

These connections are shown more clearly in Figure 11 in which strip cell 14 is indicated by a dotted line. As there shown, strip cell 14 comprises a plurality of component Ohmart cells, or component radiant energy electric generators 15, each cell including a positive electrode 24 and a negative electrode 25. The individual cells are connected in parallel with one another and the two terminal electrodes of strip cell 14, one being positive and one negative, are respectively connected to the negative electrode 26, and the positive electrode 27 of the compensating cell. Thus the strip cell and compensating cell are connected in parallel opposition or in short circuited relationship to one another. The junction at the positive electrode 27 of the compensating cell is joined to one input terminal 28 of the measuring or control device, while the junction at the negative electrode 26 of the compensating cell is in turn connected to input terminal 30 of the measuring device.

A preferred form of strip cell construction is disclosed in Figures 3 and 4. As there shown, a strip cell 14 comprises a plurality of individual Ohmart cells 15. Each cell 15 includes a cylindrical casing 32 constructed of brass or other radiation permeable material. One end of the casing, which I shall arbitrarily term the top, is enclosed by means of a sheet of material 33 having an upturned peripheral flange 34 which is soldered, brazed, or otherwise secured to the housing in such a manner that the top sheet 33 extends across the top of the housing along a plane spaced inwardly from the end of the housing. The cylindrical space 35 thus formed in the end of the casing houses a spring connection 36 which is soldered to lead 37 extending outwardly from the interior of the cell through a glass to Kovar seal 38, mounted in a suitable opening in sheet 33.

The opposite, or bottom end, of the housing is enclosed by means of a heavy plate 39, which is soldered to the housing and includes an outwardly projecting annular flange 40 of substantially the same outer diameter as the inner diameter of the flange formed on the top member. Annular flange 40 is configurated to form a peripheral groove 41 for retaining O ring 42. Plate 39 is also provided with a suitable opening to receive a glass to Kovar seal 43 through which pin 44 is brought out of the housing, and a second threaded opening in which a suitable valve 45 is inserted to seal off the housing after the filling gas has been inserted into the cell.

A central pillar, or post, 46 is set within a recess formed in plate 39 and is soldered or brazed in place. The pillar is constructed of steel or other suitable conductive material and extends substantially the entire length of the housing. The top end of the pillar is provided with a threaded opening 48 and a cylindrical support element 50, preferably constructed of a conductive material, is fitted over the top of the post and is held in place by means of a bolt 49 engaging threaded opening 48. Support member 50 is provided with a circular groove for receiving one end of negative electrode 51.

The negative electrode comprises a cylindrical sheet of brass shim stock, preferably coated with an active material such as cadmium, magnesium or zinc. The electrode is placed within the peripheral groove and is then brazed or soldered to the mounting member to hold it in place. In addition to the cylindrical negative electrode, it is preferable to coat the interior of housing 32 and the outer surface of post 46 with the same electrode material used to coat cylinder 51. It is apparent that these three elements are in electrical connection with one another since the casing, and post and support member 46 are all electrically conductive.

A brass annular mounting ring 52 is disposed adjacent to bottom plate 39 and is spaced therefrom by means of a suitable insulator such as teflon ring 53, the mounting ring being secured to the teflon ring by means of bolts 54 and the teflon ring in turn being fastened to bottom plate 39 by means of bolts 55. Mounting ring 52 is provided with two concentric grooves 56 for receiving positive electrodes 57. These electrodes are constituted by a material electrochemically different from the negative electrode. For example these electrodes may be formed from cylinders of a foil or brass shim stock coated with lead dioxide or colloidal graphite.

The positive electrode assembly 57 is electrically connected to terminal spring 58 through mounting plate 39 and pin 43. The positive electrodes are also connected to terminal spring 36 at the opposite end of the housing through pin 37. Thus, both positive electrode members are insulated from the housing and are connected to a spring connector disposed within an annular space provided in the top and bottom closing members.

When assembling two cells 15 to form a strip cell the cells are oriented so that the top of one cell is disposed adjacent to the bottom of another cell. The springs are interlocked by engaging their turns and the cells pulled apart, stretching the two springs which are then soldered to form an electrical connection. The annular flange 40 at the bottom of one cell is then inserted within the cylindrical space formed in top 33 of the other cell, the outer surface of bottom flange 40 fitting snugly within top flange 34, the O ring 41 is compressed between these members to provide a watertight seal for the connected electrodes. The cells are then locked in place by inserting bolts 60 through the plurality of aligned threaded openings formed in housing 32 and flanges 34 and 40. If desired, other means for locking the cells together, such as bayonet or threaded couplings may be employed. The positive electrodes and housings of each cell function as conductors to join adjacent cells and the strip cell is completely enclosed, requiring no internal leads to interconnect the component Ohmart cells.

A preferred embodiment of strip source is shown in Figure 5 and includes a plurality of component sources 61. Each component source comprises housing in the form of a cylindrical tube 62 constructed of brass or some other radiation permeable material. Mounted within the housing 62 is a strip of radioactive material 63, the strip extending longitudinally within the housing, preferably along the housing axis for substantially the entire length of the housing. The radioactive material may be in the form of a cobalt wire or a strip of radium coated foil, or it may be formed by the mixture of radioactive powder and inert material. In the embodiment shown the material is constituted by a thin wire which is packed in an inert material 64 such as "Fiberfrax." The ends of the tubing are enclosed by plugs 66 and 67, soldered to the ends of the tube to form an airtight enclosure. Plug 66 is threaded to form a female coupling, while plug 67 is provided with a threaded extension 68 to form a male coupling. To assemble two or more component strip sources, the housings are aligned longitudinally and the male coupling of one housing is threaded into the female coupling of the other. To facilitate this operation the portion of the plugs extending beyond the tubing is preferably of a polygonal configuration. When several of these individual component strip sources are assembled the complete strip source contains radioactive material substantially uniformly distributed for approximately the entire length of the strip.

One preferred form of compensating cell is shown in Figures 7 and 8 and includes a cylindrical housing 71 formed of brass or some similar material. One end of the compensating cell is enclosed by means of an annular plate 72, while the other end of the cell is enclosed by means of a suitable cap 73 which is soldered to the housing and is provided with openings for glass to Kovar seal 74 and filling tube 75. An elongated well member 76 constructed of radiation permeable material is mounted in the central aperture 77 of annular plate 72 and extends longitudinally into the compensating cell. The well member is closed at its inner end so that the annular space between the well member and housing is completely sealed off to retain the gas introduced through filling tube 75.

The function of the compensating cell is to produce a current of opposite polarity to that of the strip cell or other cell to which it may be connected. As pointed out above, the compensating cell is thus connected in parallel-opposed, or short circuit, relationship to the strip cell. I have found that by constructing the compensating cell so that its outer casing comprises the positive electrode while the negative electrode is insulated, that all problems of externally insulating the cell and shielding it are eliminated. Thus, whether a compensating cell is connected to a strip cell as shown in Figure 1, or whether it is mounted in the control or measuring apparatus as shown in Figure 2, the housing of the compensating cell can be fastened directly to the housing of the strip cell or the control or measuring device housing. Not only does this eliminate the need for special insulation for the compensating cell, but in addition it facilitates the use of the housing as a shield.

In the embodiment shown, the negative electrode 80 of the cell is formed by a cylindrical tube made of brass shim stock coated with an active material such as cadmium, zinc, magnesium or lead. This electrode is supported within the housing by means of a stiff wire, or pin, 81 soldered to the electrode and mounted within the glass to Kovar seal. The positive electrode is constituted by a coating of a noble material such as silver, gold, lead dioxide or colloidal graphite deposited on the inner wall of housing 71 and on the outer surface of well member 76.

The compensating cell also includes a cylindrical cap 84 adapted to overfit one end of the cell. The cap is preferably provided with a longitudinal slit 85, ears 86 being formed on opposite edges of the slit so that when the cap is slipped over the end of housing 71 it may be held in place by means of a bolt passing through aperture 87 in each of the ears, drawing the ears together. One end of the cap is enclosed by means of an end plate 88, including a threaded central aperture. An elongate screw is threaded through the aperture and supports a radioactive material holder 90 at its inner end.

As shown, the radioactive material holder is in the form of a cylindrical member fitted over the end of screw 91. The member is configured to form a recess containing a quantity of radioactive material 92, the material being held within the slot by means of a quantity of wax or other sealing material 93. The outer end of screw 91 is preferably provided with a transverse slot to facilitate the turning of the screw by means of a screw driver or other implement. Alternatively a knob or some other turning means could be provided in lieu of the transverse slot. A lock nut 89 is threaded over the screw for locking the radioactive material in place once it has been positioned.

The magnitude of the current produced by the compensating cell can readily be varied by adjusting the position of the radioactive material within the well; this is accomplished by turning screw 91, threading the screw in and out of well 76. A maximum current will be produced when the source is disposed midway between the ends of the compensating cell. As the source is advanced or withdrawn from this position, the "cell geometry" is changed, fewer ions are formed and the current output of the compensating cell is decreased.

In order to facilitate an understanding of the present invention, a brief description will be given of the manner in which a measuring device such as that shown in Figures 1 and 2 is set up and operated. When installing the apparatus, a suitable number of individual Ohmart cells and component radioactive strip sources are joined together as explained above so that the total lengths of the assembled strip cell and strip source are substantially equal to, or slightly greater than, the range of liquid levels to be measured. The strip cell and strip source are then mounted adjacent to the liquid container so that radiation emitted from the source, passes through the liquid, before impinging upon the cell. Both the source and cell are aligned so that their tops correspond approximately to the highest level to be measured, and their bottoms correspond approximately to the lowermost level to be measured. After the terminal electrodes of the strip cell have been connected to a compensating cell and to the measuring instrument as described above, the apparatus is ready for calibration.

Before describing the method of calibration I would like to point out that as explained in my above identified application on a "Comparator," connecting two Ohmart cells in short circuit relationship does not in any way injure either of the cells, rather it facilitates the operation of the cells at their maximum sensitivity by minimizing the potential developed by each of the cells. When two Ohmart cells are connected in parallel opposition with an external load resistance such as an indicating mechanism, and each of the cells produces the same current, the positive ions formed in each cell will be neutralized by electrons flowing from the other cell in which they have been freed and collected. While in such a case the current flowing through the cells is a maximum, no current flows in the external circuit, and substantially no potential difference exists between the two electrodes of each cell.

When, however, the output of one of the cells is reduced or increased so that it differs from the output of the other cell, one of the cells will become dominant and cause a current flow through the external circuit, that is, more ions will migrate to its positive electrode than can be neutralized by the electrons supplied by the other cell. In this event, the dominant cell will force its excess electrons through the external circuit to neutralize the excess ions collecting on its positive electrode. Simultaneously, the potential of the dominant cell will rise to the magnitude required for the passage of these electrons through the circuit. This potential rise of the dominant cell, or the current flow through the external circuit constitute the net output signal of the two cells. Obviously, in the present embodiment, the polarity of the voltage and the direction of current flow will depend upon whether the strip or the compensating cell dominates, and the magnitude of each will reflect the difference in the output of the two cells.

When calibrating a liquid level measuring device of the type shown in Figures 1 and 2, the tank is preferably completely drained, or at any rate drained below the lowest level to be measured. The position of the radioactive material in the compensating cell is then adjusted so that the net current output of the strip cell and compensating cell is zero. The indicator dial should then read zero, it being understood that the indicator is preferably provided with a linear scale, reading directly in feet or other units of liquid height. Next, the container is completely filled with liquid, and the sensitivity of the apparatus is adjusted until the indicator reads the maximum height. This can be accomplished in any convenient way, such as by adjusting the value of the impedance to which the net current output of the cells is applied, or by adjusting the amplification factor of an amplifier incorporated into the indicating mechanism, or by adjusting the voltage sensitivity of the indicating meter. Since, as is explained below, the variation of the net current output with liquid level is linear, each indicator reading intermediate the maximum and minimum readings automatically corresponds to the height of the liquid within the container, and no calibration is required at any of the other intermediate liquid levels.

The manner in which the net current output of the strip cell and compensating cell varies with changes in liquid level is shown in Figure 9. As there shown, curve 94 represents the relationship between the net current output of a strip cell and compensating cell, when used in conjunction with a point source of radiation when procuring the data for this graph, the compensating cell was adjusted so that its current output approximately equaled the current output of the strip cell when the fluid was completely drained from the container.

Then as liquid was introduced into the container the net current output of the cells actually decreased until the container was approximately a quarter full. Since the ordinate scale of the graph is arranged to show current increases when the output of the compensating cell predominates over that of the strip cell, the "decrease" in the net current output of the cells shows that the current generated by the strip cell increased, even though the liquid was interposed between a portion of the strip cell and source. This apparently paradoxical behavior can be explained by the fact that a greater quantity of radiation was back-scattered by the rising liquid than was absorbed by it, so that the total quantity of radiation impinging upon the strip cell increased. However, as the liquid level continued to rise, more of the radiation emitted by the source was absorbed, and consequently, the amount impinging upon the strip cell decreased. Thus, the current output of that cell decreased, and the net current output of the strip cell and compensating cell increased rapidly. This increase continued until the container was two-third filled with liquid, at which time the net current output again declined, indicating an increase in back-scattered radiation impinging upon the strip cell.

From the graph shown it is apparent that the current output of the Ohmart cell with a point source cannot be employed to index the height of the liquid when the liquid is at a level below that corresponding to the second abscissa marking, nor above a height corresponding to an abscissa of 4.1. For in these ranges any given current corresponds to each of two liquid levels. Thus the output of the Ohmart cell can be used to index the liquid level height over a range of only approximately one-third of the total liquid level variation.

Curve 95 shows the relationship between the net current output of a strip cell and compensating cell when the strip cell is used in conjunction with a strip source. It is apparent from this graph that although the maximum current difference is less than that when a point source is used; nevertheless, the current output of the cell furnishes an accurate index of liquid level throughout a range extending from a level corresponding to an abscissa of 1.1 to one of 5.6. This represents approximately seventy per cent of the total liquid height and consequently the strip cell furnishes an index of the liquid height over a range considerably more than double that of a cell operating in conjunction with a point source. Furthermore, it is apparent that throughout almost this entire range the current output of the cell varies linearly with the height of the liquid column. The advantage of this is that the instrument does not need to be especially calibrated once the maximum and minimum points are established as shown below.

While the use of a point source limits the range of levels which can be measured by a strip cell, its use may be preferable when measurements are only desired over a small range or where a cut-off device is to be operated when the liquid reaches a predetermined level. The reason for this is that with a point source the net current output of a strip cell and compensating cell increases much more rapidly with increases in liquid level than is the case when a strip source is used. This greater increase in current for a given increment of liquid level facilitates the obtaining of precise measurement and accurate control.

The function of the collimator is to give to a liquid level measuring apparatus the most desirable characteristics of both a strip source and point source. The collimator, when placed adjacent to the strip source, causes the radiation to be directed through the liquid in a narrow sharply defined beam; and when associated with the strip cell, it absorbs substantially all of the radiation directed toward the cell, except that which is traveling directly from the source. In either case, the collimator is effective to reduce the quantity of back scattered, or reflected, radiation impinging upon the cell.

Consequently, with a collimator, the range of liquid levels over which a linear current is obtained is as wide as that obtained from the use of a strip cell, and the rate of current increase for a given change in liquid level approaches that obtained from the use of a point source.

Figure 10:
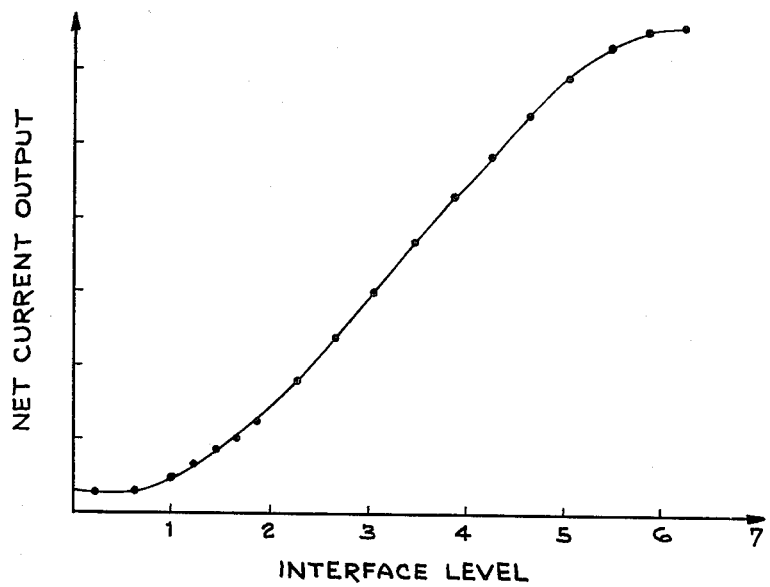
Figure 10 is a graph showing the manner in which the current output of an Ohmart cell varies with changes in the height of the interface between two immiscible liquids.

Figure 10 is a graph showing the relationship between the net current output of a strip cell and compensating cell and the height of a liquid interface existing between two layers of immiscible liquids. It can be seen that the current variations are almost identical with that occurring in straight liquid level measurement as shown in Figure 9, the current providing an accurate index of the interface height over a range of approximately eighty-five per cent of the maximum interface height.

If the container is filled with a substantially homogeneous material, such as a liquid or granular material, a strip cell and strip source can be arranged in the manner shown in Figures 1 and 2 to measure or control the density of the material. With the apparatus set up in this manner, the net current output of the strip cell and the compensating cell will vary in a linear manner with variations in the density of the material.

From the foregoing description of the principles of this invention and a detailed disclosure of a preferred embodiment, those skilled in the art will readily comprehend the various modifications to which my invention is susceptible. Thus, for example, while the strip cell and strip source have been shown in the form of straight members, they can, if desired, be irregularly configurated to conform to the shape of an arcuate or angular container. Furthermore, while the apparatus shown produces a linear response, and while this is advantageous in most installations for the reasons set forth, there may be occasions when a nonlinear response is desired. Such a nonlinear response can readily be attained by modifying the apparatus of the type shown in Figures 1 and 2, so that the spacing of the cell and source is not uniform over its entire length, but rather the elements are brought closer together adjacent certain portions than they are at others. Other structural modifications will also suggest themselves, such as the elimination of the threaded male and female couplings of the strip source components and the substitution of an additional outer cylinder within which component source housings 62 are stacked in endwise relationship.

Having described my invention, I claim:

1. Apparatus for measuring the level of a material within a container, said apparatus comprising a strip cell, including a plurality of radiant energy electric generators in vertical juxtaposition, said radiant energy electric generators being connected in parallel electrical relationship, a source of radiation disposed in spaced relationship with said strip cell, and disposed relative to said container so that a portion of the radiation emitted from said source passes through said material and impinges upon said cell, a compensating cell connected in parallel opposed relationship with said strip cell, and means responsive to the output signal of said cells for indicating material level.

2. Apparatus for generating an electrical signal responsive to the density of a material within a container, said apparatus comprising a strip cell including a plurality of radiant energy electric generators in vertical juxtaposition, said radiant energy electric generators being connected in parallel electrical relationship, a source of radiation disposed in spaced relationship with said strip cell, and disposed relative to said container so that a portion of the radiation emitted from said source passes through said material and impinges upon said cell, a compensating cell connected in parallel opposed relationship with said strip cell, and means responsive to the output signal of said cells.

3. Apparatus for measuring the level of a material within a container, said apparatus comprising a strip cell including a plurality of radiant energy electric generators in vertical juxtaposition, said radiant energy electric generators being connected in parallel electrical relationship, a source of radiation disposed in spaced relationship with said strip cell, and disposed relative to said container so that a portion of the radiation emitted from said source passes through said material and impinges upon said cell, means for collimating the radiations whereby only radiation passing directly from said source to said cell impinges upon said strip cell, a compensating cell connected in parallel opposed relationship with said strip cell, and means responsive to the output signal of said cells for indicating material level.

4. Apparatus for controlling the level of a material within a container, said apparatus comprising a strip cell including a plurality of radiant energy electric generators in vertical juxtaposition, said radiant energy electric generators being connected in parallel electrical relationship, a source of radiation disposed in spaced relationship with said strip cell, and disposed relative to said container so that a portion of the radiation emitted from said source passes through said material and impinges upon said cell, a compensating cell connected in parallel opposed relationship with said strip cell, and means responsive to the output signal of said cells for affecting the material level.

5. Apparatus for measuring the level of a material within a container, said apparatus comprising a strip cell including a plurality of radiant energy electric generators in vertical juxtaposition, said generators being connected in parallel electrical relationship, an elongated strip source of radiation disposed in spaced relationship with said strip cell, and disposed relative to said container so that a portion of the radiation emitted from said source passes through said material and impinges upon said cell, a compensating cell connected in parallel opposed relationship with said strip cell, and means responsive to the output signal of said cells for indicating material level.

6. Apparatus for controlling the level of a material within a container, said apparatus comprising a strip cell including a plurality of component radiant energy electric generators in vertical juxtaposition, said generators being connected in parallel electrical relationship, an elongated strip source of radiation disposed in spaced relationship with said strip cell, and disposed relative to said container so that a portion of the radiation emitted from said source passes through said material and impinges upon said cell, a compensating cell connected in parallel opposed relationship with said strip cell, and means responsive to the output signal of said cells for affecting the material level.

7. Apparatus for measuring the level of a material within a container, said apparatus comprising a strip cell including a plurality of component radiant energy electric generators in vertical juxtaposition, said generators being connected in parallel electrical relationship, an elongated strip source of radiation disposed in spaced relationship with said strip cell, and disposed relative to said container so that a portion of the radiation emitted from said source passes through said material and impinges upon said cell, said strip cell and strip source being of substantially the same length, said length corresponding approximately to the range of material levels to be measured, a compensating cell connected in parallel opposed relationship with said strip cell, and means responsive to the output signal of said cells for indicating material level.

8. In apparatus for measuring the level of a material within a container, the combination of a strip cell including a plurality of radiant energy electric generators in vertical juxtaposition, said generators being connected in parallel electrical relationship, a quantity of radioactive material substantially uniformly distributed in a vertical plane, said radioactive material being arranged relative to said container and said strip cell so that a portion of the radiation emitted from said material passes through said material and impinges upon said cell.

9. In apparatus for measuring the level of a material within a container, the combination of a strip cell including a plurality of radiant energy electric generators in vertical juxtaposition, said generators being connected in parallel electrical relationship, a quantity of radioactive material substantially uniformly distributed in a vertical plane, said radioactive material being arranged relative to said container and said strip cell so that a portion of the radiation emitted from said material passes through said material and impinges upon said cell, said radioactive material being distributed over a length substantially equal to the length of the strip cell and being disposed in horizontal alignment with the material levels to be measured.

10. Apparatus for measuring the level of a material within a container, said apparatus comprising a strip cell including a plurality of component radiant energy electric generators in vertical juxtaposition, said generators being connected in parallel electrical relationship, an elongated strip source of radiation disposed in spaced relationship with said strip cell, and disposed relative to said container so that a portion of the radiation emitted from said source passes through said material and impinges upon said cell, means for collimating said emitted radiation to prevent any back-scattered radiation from impinging upon said cell, a compensating cell connected in parallel opposed relationship with said strip cell, and means responsive to the output signal of said cells for indicating material level.

References Cited in the file of this patent

UNITED STATES PATENTS

| | | |
|---|---|---|
| 2,323,128 | Hare | June 29, 1943 |
| 2,479,882 | Wallhausen et al. | Aug. 23, 1949 |
| 2,565,963 | Graham | Aug. 28, 1951 |
| 2,592,115 | Carroll | Apr. 8, 1952 |
| 2,640,953 | Rossi | June 2, 1953 |
| 2,651,730 | Linder | Sept. 8, 1953 |
| 2,661,431 | Linder | Dec. 1, 1953 |
| 2,674,695 | Grace, Jr. | Apr. 6, 1954 |

OTHER REFERENCES

"A New Electronic Batter," The Electrician, vol. 10, October 31, 1924, page 497.